(12) United States Patent
Corcoran (10) Patent No.: US 7,773,587 B2
(45) Date of Patent: *Aug. 10, 2010

(54) VOICE OVER INTERNET PROTOCOL NETWORK TEST DEVICE AND METHOD

(75) Inventor: Kevin F. Corcoran, Middletown, MD (US)

(73) Assignee: Current Technologies, LLC, Germantown, MD (US)

( * ) Notice: Subject to any disclaimer, the term of this patent is extended or adjusted under 35 U.S.C. 154(b) by 99 days.

This patent is subject to a terminal disclaimer.

(21) Appl. No.: 12/265,061

(22) Filed: Nov. 5, 2008

(65) Prior Publication Data

US 2009/0097408 A1    Apr. 16, 2009

Related U.S. Application Data

(63) Continuation of application No. 10/625,280, filed on Jul. 23, 2003, now Pat. No. 7,460,467.

(51) Int. Cl.
*H04B 17/00* (2006.01)
*H04L 12/66* (2006.01)
*H04J 11/00* (2006.01)

(52) U.S. Cl. .............. 370/352; 370/208; 370/252; 379/1.02; 379/27.03

(58) Field of Classification Search ......... 370/208–252, 370/352–356, 241, 389, 392; 379/1.02, 27.03; 375/E7.002; 348/E7.049; 455/67.11
See application file for complete search history.

(56) References Cited

U.S. PATENT DOCUMENTS

| 4,001,559 A | 1/1977 | Osborne et al. |
| 4,479,033 A | 10/1984 | Brown et al. |
| 4,495,386 A | 1/1985 | Brown et al. |
| 4,829,298 A | 5/1989 | Fernandes |
| 5,319,634 A | 6/1994 | Bartholomew et al. |

(Continued)

FOREIGN PATENT DOCUMENTS

DE    100 47 648 A1    4/2002

(Continued)

*Primary Examiner*—Afsar M. Qureshi
(74) *Attorney, Agent, or Firm*—Mel Barnes; Capital Legal Group, LLC (57) ABSTRACT

The invention includes a device and a method for testing a communication network that includes an Internet Protocol (VoIP) network. The inventive device includes a user interface for communicating results of a test, a transceiver for allowing the test device to communicate with a telecommunications network, and a digital signal processor for reformatting a communication signal to be tested by the device. The digital signal processor may include at least one coder/decoder that uses various compression protocols including wherein the digital signal processor uses at least one of the following data compression techniques: G.711a-law, G711µ-law, G.720, G.723.1, G.726, G.728, G.729, G.729A, and G.729AB2. The transceiver also may be a power line modem. The inventive device may include a processor, random access memory, read only memory, a user interface, and a network interface. The inventive method for testing the VoIP network includes accessing a telecommunications network that includes the VoIP network, conducting tests on the VoIP network using a butt set device, and displaying results of the test on the user interface located on the test device. The present invention may also comprise a power line communication VoIP network telephone.

49 Claims, 3 Drawing Sheets

U.S. PATENT DOCUMENTS

| | | |
|---|---|---|
| 5,774,526 A | 6/1998 | Propp et al. |
| 6,040,759 A | 3/2000 | Sanderson |
| 6,072,858 A | 6/2000 | Bellin |
| 6,404,773 B1 | 6/2002 | Williams et al. |
| 6,611,134 B2 | 8/2003 | Chung |
| 6,668,058 B2 | 12/2003 | Grimes |
| 7,076,378 B1 | 7/2006 | Huebner |
| 7,388,946 B1 * | 6/2008 | Mussman et al. ........ 379/15.01 |
| 2001/0033566 A1 | 10/2001 | Grimes |
| 2001/0046288 A1 | 11/2001 | Grimes |
| 2002/0015387 A1 | 2/2002 | Houh |
| 2002/0161542 A1 | 10/2002 | Jones et al. |
| 2003/0021388 A1 * | 1/2003 | Starr et al. ................. 379/1.04 |
| 2003/0021391 A1 | 1/2003 | Rubin et al. |
| 2003/0067910 A1 | 4/2003 | Razazian et al. |
| 2004/0001499 A1 | 1/2004 | Patella et al. |
| 2004/0037317 A1 | 2/2004 | Zalitzky et al. |
| 2007/0029107 A1 | 2/2007 | Aoki et al. |
| 2007/0291907 A1 | 12/2007 | Corcoran |

FOREIGN PATENT DOCUMENTS

| | | |
|---|---|---|
| DE | 101 00 181 A1 | 7/2002 |
| EP | 0 933 883 A2 | 8/1999 |
| EP | 0 933 883 A3 | 8/1999 |
| GB | 1 548 652 | 7/1979 |
| GB | 2 335 335 A | 9/1999 |
| WO | WO-84/01481 A1 | 4/1984 |
| WO | WO-03/040732 A2 | 5/2003 |

* cited by examiner

Figure 3

VOICE OVER INTERNET PROTOCOL NETWORK TEST DEVICE AND METHOD

CROSS REFERENCE TO RELATED APPLICATIONS

This application claims priority to, and is a continuation of, U.S. application Ser. No. 10/625,280 filed Jul. 23, 2003, now U.S. Pat. No. 7,460,467 which is incorporated herein by reference in its entirety.

FIELD OF THE INVENTION

The invention is related to the field of telecommunications and particularly to the field of communications over a Voice Over Internet Protocol (VoIP) network.

BACKGROUND OF THE INVENTION

Telecommunications techniques have been limited to carrying communication signals over traditional communications networks, like the Public Switched Telephone Network (PSTN). Recently, however, telecommunications techniques have expanded beyond the PSTN to more sophisticated communication networks, like the Internet. As a result of Internet telephony, different data protocols have been devised to use IP networks for voice communications. One such protocol is Voice Over Internet Protocol. VoIP is a term used in Internet telephony for a set of facilities for managing the delivery of voice information using the Internet Protocol (IP). In general, this constitutes communicating voice band information, such as speech, in digital form in discrete packets rather than in the traditional analog circuit-switched protocols of the PSTN.

As with any new technology, secondary considerations, like testing and maintenance equipment necessary to ensure the operation of VoIP, have lagged behind the advent of the VoIP technology itself. In particular, there currently is not a portable, ruggedized test set to allow field personnel to perform simple tests of the VoIP network and its services. The traditional PSTN setting has such a test device, called a butt-in set or "butt set." This traditional butt set is an oversized, ruggedized telephone handset. The butt set has leads or wires usually at the bottom of the device. The leads often have connectors (e.g. alligator clips) that permit field personnel to tap into and test a particular phone line in locations where a standard RJ-11 phone jack is not available (e.g., in a wiring closet, at an outside vault, or cross-connect panel, etc.). The butt set also allows the field personnel to perform simple tests of phone lines, like determining the availability of a dial tone, for example.

However, currently there is not a butt set device for testing VoIP networks and its services. This is because current butt sets are designed to operate with the traditional PSTN analog voice lines, but cannot be used with VoIP's digital packetized services. As a result, field technicians have been forced to resort to other more complex and less portable methods and equipment for testing VoIP. However, these methods and equipment often do not permit the technician to test the VoIP network at any location in the network, like the traditional butt set. Nor do these present solutions provide a portable solution.

For example, field technicians may have to gain access to a customer premises to use premise VoIP phones where a VoIP gateway is accessible. This solution, however, by limiting the technician's access to the network within the customer premises, does not permit the technician to test the network at locations that may be more conducive to resolving a problem.

In another example, technicians may have to resort to carrying standard commercial, nonruggedized VoIP phones having their own dedicated VOIP gateway. This unwieldy alternative may become even more complicated by the need for additional specialized equipment to test a particular network (e.g, a powerline modem for a powerline communication network).

Therefore, there is a need for a more efficient and portable technique for testing IP networks, including VoIP networks.

SUMMARY OF THE INVENTION

The invention includes a device and a method for testing a communication network that includes a VoIP network. The inventive device includes a user interface for receiving user inputs and communicating results of a test, a transceiver for allowing the test device to communicate with an IP network, and a processor for processing test signals and controlling operation of the device. In addition, the invention may comprise a digital signal processor that may include at least one coder/decoder that uses various compression protocols including, but not limited to, G.711a-law, G711µ-law, G.723.1, G.726, G.728, G.729, G.729A, and G.729AB2. The transceiver also may be a power line modem, an Ethernet modem, a digital subscriber line (DSL) modem, or a cable modem depending on the network to be tested. The inventive device may additionally include random access memory, read only memory, and a network interface. Also, the user interface may comprise a microphone, a speaker, a keypad that may be communicatively coupled to a dual tone multi-frequency (DTMF) encoder, a display, and a communication interface port. The inventive device also may comprise a media access controller.

The inventive method for testing the VoIP network includes accessing a telecommunications network that includes the VoIP network, conducting tests on the VoIP network using a butt set device, and presenting visual and/or audible results of the test. The tests may include time-frequency mapping, frequency warping, intensity warping, loudness scaling, asymmetric masking, and cognitive modeling. Also, the results of the test may include incorrect Internet Protocol configuration, incorrect gateway address designation, signal echo, and call drop out.

DETAILED DESCRIPTION OF ILLUSTRATIVE EMBODIMENTS

Butt Set Device

The following description of the physical structure of the inventive device is not meant to be limiting, but is provided as just one example structure for the device, for the purposes of explanation. It should be appreciated that in practice the inventive device may take any physical embodiment, which may include a combination of software and hardware embodiments. Also, it should be appreciated that physical connection of the device with the VoIP network may occur via direct or indirect attachment and/or via wireless connection, for example.

Figure 1:
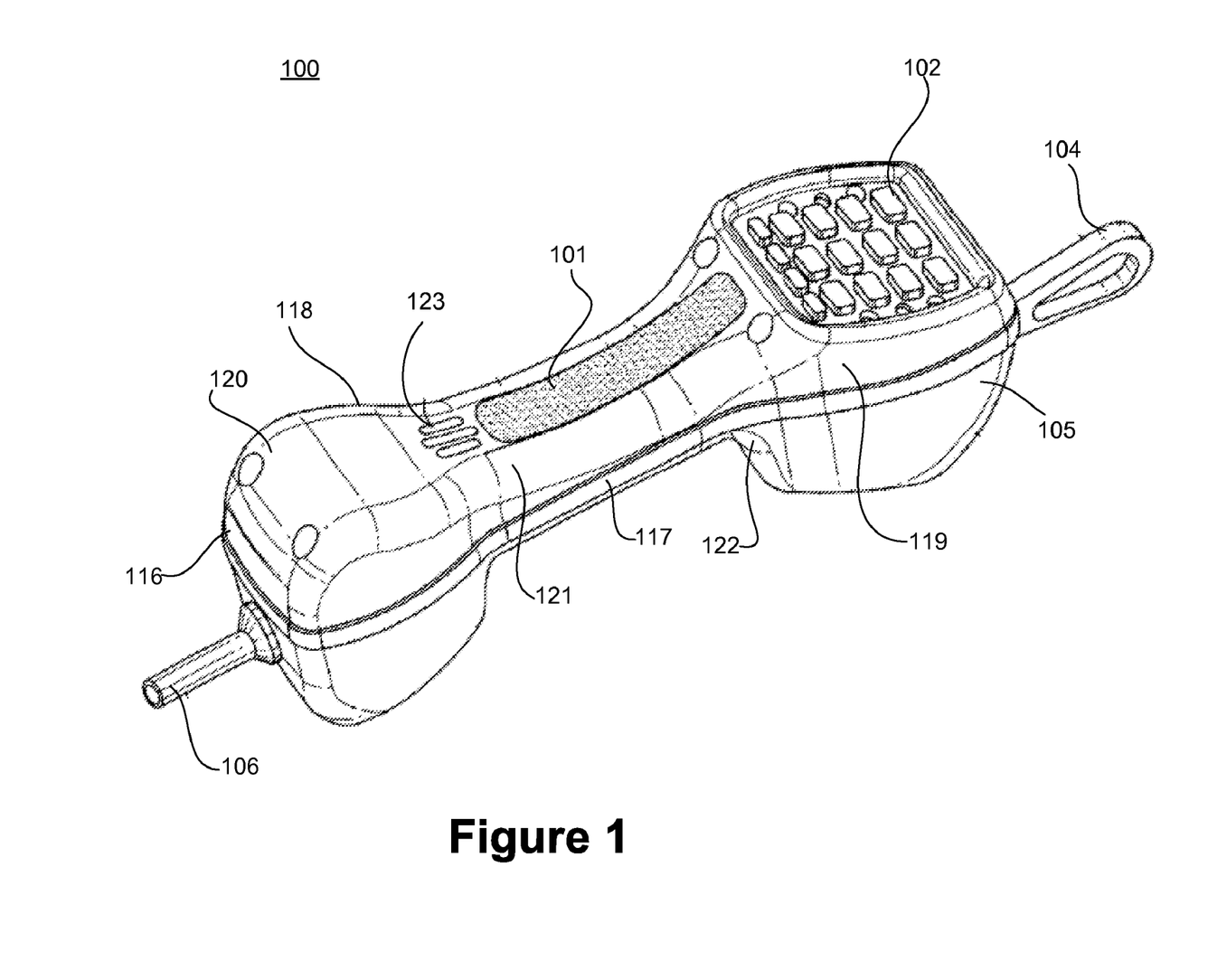
FIGS. 1 and 2 provide an example physical configuration of a butt set device, according to the invention.
Figure 2:
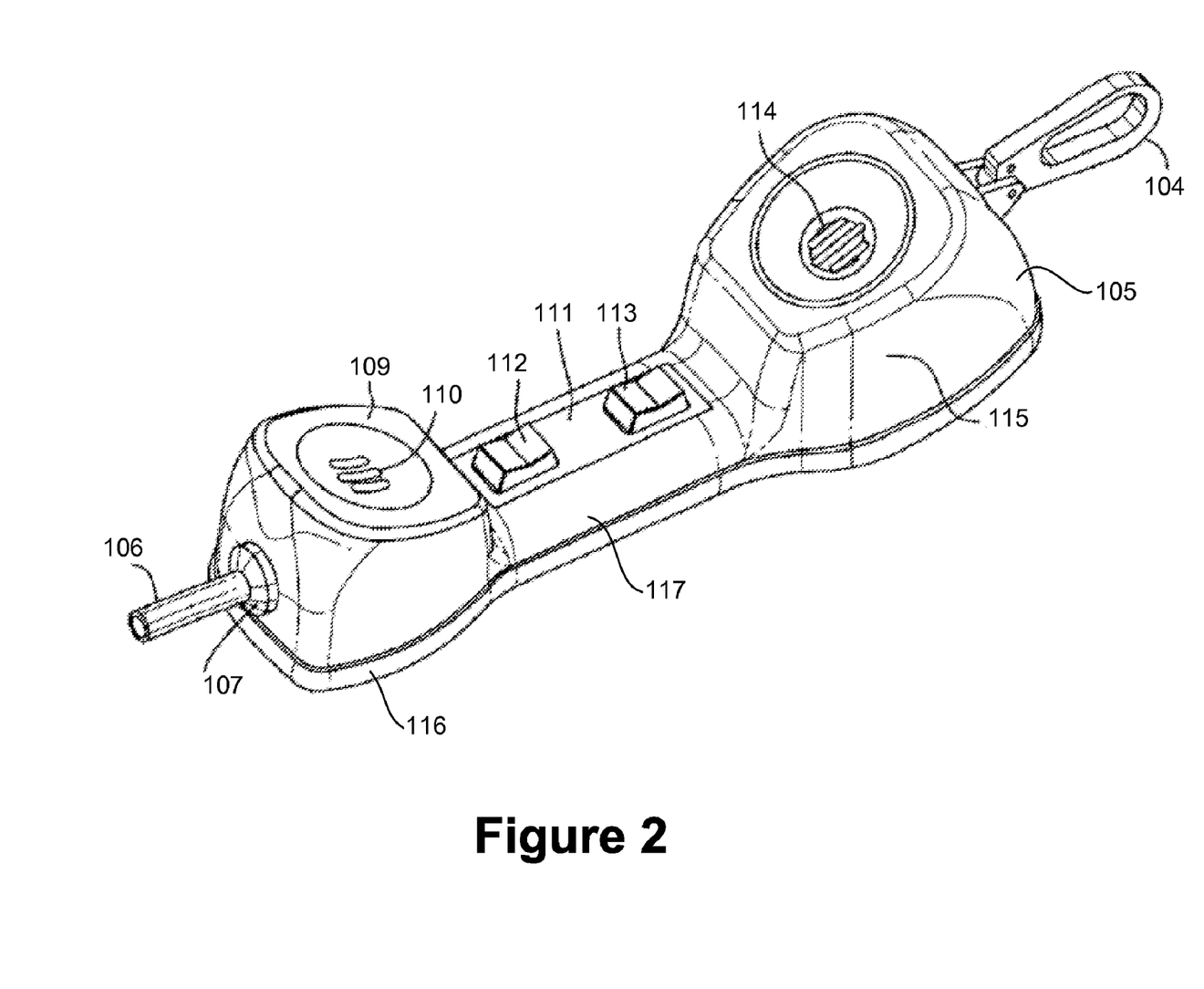

One example physical configuration of a butt set device 100 is illustrated in FIGS. 1 and 2. The butt set device 100 generally has a conventional hand-held test set configuration and construction, having a top end 105 and a loop 104 which may be attached to the user's belt or other equipment. Also, the butt set device 100 may have a bottom end 116 having an access port 107 for connection to a VoIP network under test via a cable 106. The cable 106 may be terminated with a standard Ethernet 10baseT interface (RJ-45 connector), a wall socket plug, RJ-11 connector, or coaxial connector—depending on the VoIP to which the device 100 is to be connected. A communication interface port (not shown) also may permit the butt set device 100 to communicate with other peripheral devices, like a portable computer, PSTN, and/or telephone. The communication interface port may end be terminated with a tip/ring interface to communicate with a traditional telephone networks, and/or an RJ-11 connector to provide an interface for a traditional telephone for example. Thus, in this embodiment the access port 107 provides the interface to the VoIP network and the communication interface port provides the interface to other devices such as a telephone, a PSTN, etc. The butt set device 100 may have a center section 117 that is intermediate to the top and bottom ends 105, 116 and is configured to fit the hand of the user.

The top end 105 of the butt set device 100 has an earpiece section 115 housing the test set's audio output device (e.g., a speaker) (not shown) beneath a receiver grill 114. The bottom end 116 has a mouthpiece section 109 housing the test set's audio input device (e.g., a microphone) (not shown) beneath a grill 110. A front face 111 of the center section 117 of the butt set device 100 may include one or more test set switches 112 and 113, such as those associated with the standard tone/pulse dialing and talk/monitor mode functions of a test set.

The butt set device 100 may include a rechargeable battery (not shown) similar to conventional butt set devices, and well known to those skilled in the art. Also, the butt set device 100 may receive primary and/or backup power using "Power over Ethernet" (PoE) techniques, well known to those skilled in the art. The back or opposite side 118 of the butt set device 100 may include a top end 119 containing a keypad 102 (or other manual input device such as a touch screen), a bottom end 120 containing a grill 123 beneath which a ringer or other audible indicator (not shown) is located, and a center section 121 intermediate the top and bottom ends 119, 120. Like the center section 111 of the opposite face, a center section 121 of the back end 118 is configured to allow butt set device 100 to fit comfortably in the user's hand. The face 122 of the center section 121 also may be contoured to rest on the shoulder of the user, and therefore may have a non-skid pattern 101 or material molded into its outer surface to prevent the unit from slipping.

Figure 3:
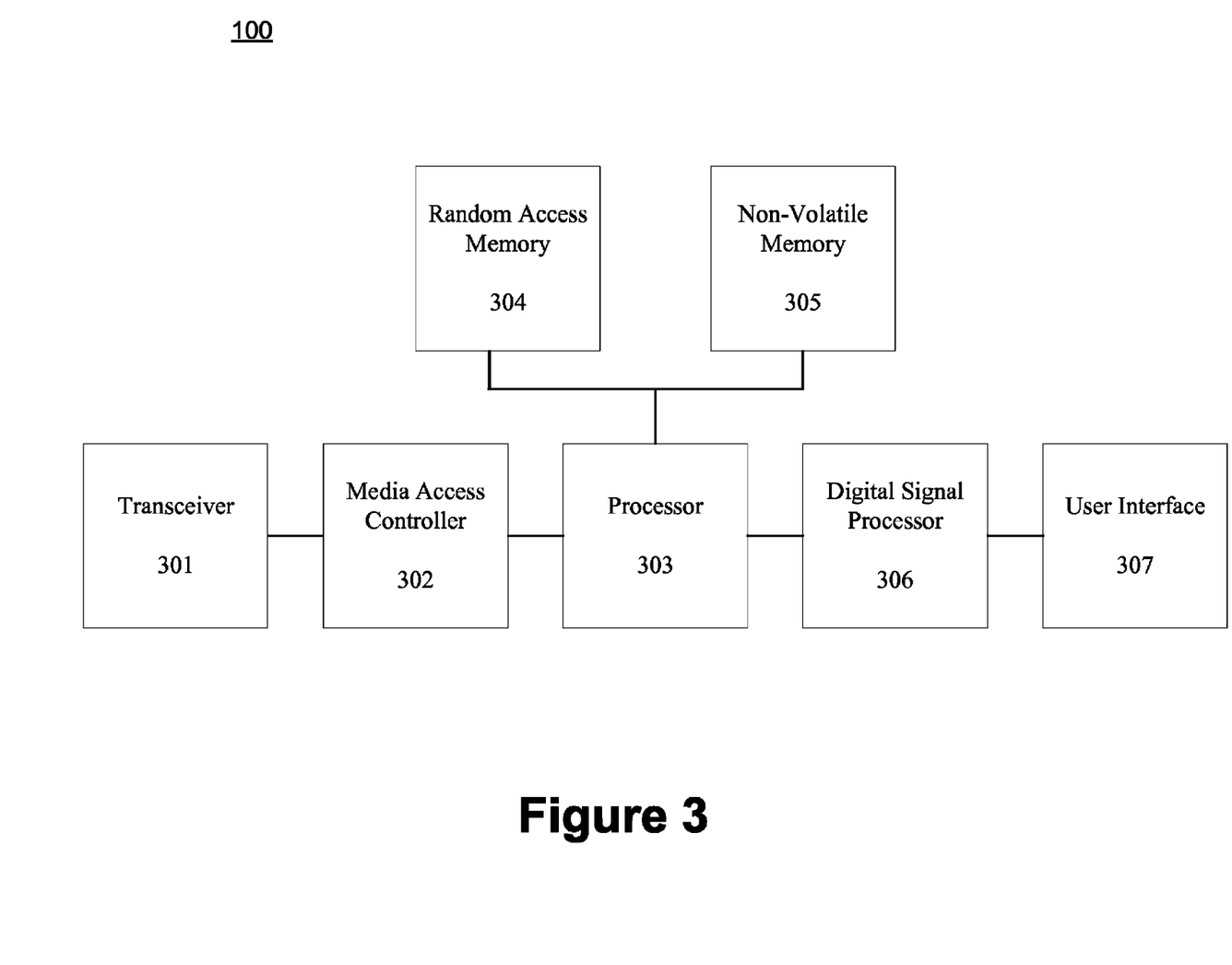
FIG. 3 is a block diagram of a VoIP butt set device.

FIG. 3 is a functional block diagram of a VoIP butt set 100, in accordance with the invention. As shown in FIG. 3, VoIP butt set 100 includes a number of functional components. Aside from the functionality described, the butt set device 100 includes specific hardware circuitry and software components analogous to traditional butt set devices, the discussion of which is beyond the scope of the present invention. Consequently, although the present invention may incorporate these devices and components, the block diagram illustrates only those specific details that are most pertinent to the present invention, so as not to obscure the disclosure with details which will be readily apparent to those skilled in the art. Therefore, FIG. 3 is intended to show the major components of the butt set device 100, so that the present invention may be more readily understood.

In addition, although certain components are shown in FIG. 3, it should be appreciated that the components shown in FIG. 3 are not exclusive but are simply provided as an illustrative embodiment. For example, as understood by one skilled in the art, butt set device 100 may include additional components, or it may operate without certain components shown in FIG. 3 (as discussed in regard to an alternate embodiment below). Also, it should be appreciated that certain functionality described within individual components in FIG. 3, may be grouped within other components or dispersed among many components.

Referring to FIG. 3, the butt set device 100 may include a transceiver 301. Transceiver 301 may be any type of transceiver necessary to communicate with the network under test. For example, the transceiver 301 may be an Ethernet modem in which case cable 106 may be terminated with a RJ-45 connector. In the power line communication (PLC) network context, the transceiver 301 may be a power line interface device (PLID) or otherwise known as a power line modem in which case cable 106 may be terminated with a two (or alternately three) prong wall socket plug. In this embodiment, the power line modem may be integrated into the wall socket plug so that the power line voltages are not received by (and kept remote from) the handset portion of device 100 to ensure the safety of the user.

The transceiver 301 may be in communication with a media access controller (MAC) 302, well known to those skilled in the art. MAC 302 may be, for example, an Ethernet MAC device. Alternately, or in addition to, MAC 302 may represent both a power line MAC device and an Ethernet MAC device. It should be appreciated that transceiver 301 and MAC 302 may be, for example, formed by a single device such as an INT51X1 (manufactured by Intellon, Inc. of Ocala, Fla.), which is a modem chip set with MAC processing functionality. MAC 302 also may be in communication with a processor 303.

The processor 303 may be in communication with a random access memory (RAM) 304 and/or with a non-volatile memory 305. Non-volatile memory 305 may be any type of memory, including for example, flash memory, EEPROM, EPROM, PROM, and/or ROM, which are well known to those skilled in the art. The memory 305 may be physically distributed in numerous chips and functional blocks (e.g., such as in a modem integrated circuit (IC), RAM IC, and ROM (IC)). The memory may have algorithms (and associated test data) for performing one or more tests or sets of tests stored therein. The processor 303 also may be in communication with a digital signal processor (DSP) 306. Based on programming stored in the memory 305, the processor 303 may direct a signal received via transceiver 301 and MAC 302 to either RAM 304, to non-volatile memory 305, or to the DSP 306. Alternately, the processor 303 may process the incoming signal according to the appropriate processing algorithm.

The DSP 306 may include certain coders/decoders (codecs) hardware and/or software used to encode and/or decode data signals on the network. For example, the codecs may operate to convert analog signals transmitted on the PSTN network to digital signals transmitted on the IP network. Also, the codecs may encode the speech received via the microphone to a digital, packetized format, and decode digital data received via the VoIP network for production at the speaker. Butt set device 100 may include one or more of the codecs necessary to communicate on a VoIP network. The number and types of codecs may vary with the desired compression ratio techniques used on the VoIP network (e.g. G.711a-law, G711μ-law, G.723.1, G.729, G.729A, G.729AB2, etc.). The DSP 306 also may be in communication with a user interface 307. As the name suggests, the user interface 307 may include various input/output components that facilitate the user's ability to understand, receive and/or provide the information communicated by the VoIP butt set device 100 or to operate the butt set device 100 itself.

For example, as discussed with reference to FIGS. 1 and 2, components of the 306 user interface 307 in communication with the DSP 306 may include a microphone (or other audio input device), a speaker (or other audio output device), a keypad 102 (and/or its associated DTMF encoder), a communication interface port (e.g., a tip/ring interface and/or a RJ-11 connector), and/or a visual display (e.g., liquid crystal display). Thus, a tip/ring interface, if present, may allow the butt set device 100 to be connected to a traditional telephone network to allow the test technician to use and/or test the traditional telephone network. The RJ-11 connector, if present, may allow the connection of a conventional telephone to the VoIP network via the butt set device 100 (e.g., to test the telephone). As will be known to those skilled in the art, many of the user interface components (e.g., the keypad, display, etc.) may be communicatively coupled to the processor directly (i.e., as opposed to being coupled to the DSP 306).

Also, butt set device 100 may include a number of user-based interface features. For example, the butt set device 100 display may include a number of different colored status indicators (not shown). Butt set device 100 may have different indicator lights, perhaps with different colors to indicate whether the network to which the butt set device 100 is connected is operating to any extent, whether, the device itself is receiving power and/or operating as expected (or according to predetermined parameters), whether a received call satisfies a call quality metric (e.g. MOS metric). Also, butt set device 100 may have a calling party identification capability that displays the identifier (e.g., phone number, IP address, etc.) of the calling party on the user interface 307. The butt set device 100 may have a number of other features commonly found in typical telephone sets, including volume control, mute capability, redial, and/or call memory.

As discussed, butt set device 100 may include modem hardware and/or software that permits the device to communicate with a particular network. For example, in the power line communication (PLC) environment, the butt set device 100 may include a separate and/or integrated PLC modem (as discussed above), while in the cable broadband cable environment market a separate and/or integrated cable modem may be used.

Example embodiments of the butt set device 100 may be a wired or wireless telephone handset. Also, the butt set device may be configured to be "docked" with and be removable from a test set base station (not shown). The test base station may also have the functionality of the butt set device itself and thus be connected directly or indirectly to the VoIP network so as to allow the removable butt set device to remotely control the operation of the base station. The butt set device 100 may be communicatively coupled to the base station via wired or wireless link.

VoIP Network Testing

The inventive device may use any of a number of techniques to determine the operability of the VoIP network. Although a VoIP network may be different from the PSTN, a communication that originates on the PSTN may be transmitted over the VoIP network. Also, voice and/or data packets that originate from the Internet may be transmitted over the VoIP network to reach a device (e.g., a telephone) on the PSTN. The VoIP network may be a conglomeration of many different types of IP networks (e.g, Internet Telephony Service Provider (ITSP) network). For example, a VoIP network may include a combination of traditional circuit-switched networks, digital packet-switched networks, and power line communication networks. As a result, the VoIP network may use "gateways."

Gateways operate to convert calls that traverse between the PSTN and the IP networks by performing analog-to-digital and digital-to-analog conversions and transmission protocol conversions. For example, for a data packet that is received from the Internet, the gateway converts the data packet into analog signals for transmission on the PSTN. The gateway also converts analog signals coming from the PSTN into digital data packets. In this way, the gateway permits two way (i.e., full-duplex) communication between users connected to either the Internet or the PSTN.

To communicate in an IP network, the butt set device 100 may have a dedicated MAC address stored in memory. Additionally, the butt set device 100 requires configuration of its IP interface. Configuration may include parameters such as an IP address, subnet mask, default IP gateway address, and/or domain name server (DNS) address. The butt set device 100 may have a dedicated IP interface configuration stored in memory or functionality (e.g. software) to establish dynamic configuration, such as using the dynamic host configuration protocol (DHCP), the trivial file transfer protocol (TFTP), etc. Thus, the butt set device 100 may include software to transmit a Dynamic Host Configuration Protocol (DHCP) request and perform subsequent steps (known in the art) to receive, store, and use an IP address via the VoIP network or via a separate wireless communication link (in which case the butt set device 100 would also include a wireless transceiver (e.g., an 802.11 or cellular transceiver).

To originate or terminate voice communications on an IP network, the butt set device 100 may also require the configuration of parameters to establish connections with other VoIP network devices. A VoIP signaling server (e.g. signaling gateway, proxy server, softswitch) may be specified for call setup and control and/or a VoIP media gateway may be specified for interconnecting with the PSTN or other circuit switched networks. Configuration parameters of the butt set device 100 to interact with such other VoIP network devices may be stored in memory or established dynamically.

In addition, butt set device 100 may have software or hardware necessary to select the proper codec to use, depending on the particular circumstances of the network. Also, the butt set device 100 may be configured with the proper signaling protocol such as, for example, H.323 (e.g., v2, v4), Session Initiation Protocol (SIP), Media Gateway Control Protocol (MGCP) (e.g., 1.0 (RFC 2705), 1.0 network based signaling 1.0 Profile, or 0.1), and/or Skinny Client Control Protocol, etc. The butt set device 100 may be programmed (i.e., stored in memory) with certain predetermined threshold values relating to jitter buffer size, packet sample rate, range of network addresses to scan for when monitoring the network, QoS metrics, etc. Such predetermined thresholds may be used to determine whether the VoIP network is operating adequately, normally, or within some other parameter.

For traditional butt set devices, an initial test is conducted to determine if a dial tone is available from the telecommunications network switch. Similar concepts in the context of VoIP may be used to permit the butt set device to determine whether a local carrier signal is available (e.g., detected) and/or to establish effective communication with the network switch or gateway. Also, voice transmissions over a VoIP network are susceptible to distortion and delays that may render a voice signal unintelligible. For example, "jitter" is the common name for a variation in the pack arrival times at the receiving server or host. Also, delay and packet loss (i.e., number of data packets lost in transmission) may be measured by the device 100. These signal qualities may be measured using any number of techniques known in the art including measuring the signal at both the transmitting end and the receiving end. Also, these signal qualities may be measured by sending a test signal from the transmitting end and measuring its return at the transmitting end. Also, butt set device 100 may be programmed to determine the average, maximum and current value for each of these and any other losses that are measured. Signal qualities may also be measured as described in RFC 1889.

In order to ensure that the voice transmissions remain intelligible, a Quality of Service (QoS) standard is employed. However, for a VoIP network, there is no assurance of the quality of voice transmissions. As a result, testing and monitoring of VoIP networks is even more important than in the traditional PSTN. The butt set device 100 may control QoS at layer 3 in the protocol stack using Type of Service (ToS) or Differential Service (DiffServ) techniques, well known to those skilled in the art. Also, the butt set device 100 may control QoS at layer 2 in the protocol stack using 802.1p prioritization. Also, the butt set device 100 may use a combination of these and other approaches (e.g., RSVP, IntServ, MPLS, etc.). If the butt set device 100 interfaces with a virtual local area network (VLAN), QoS may be accomplished using 802.1q. If the butt set device 100 interfaces with a cable network, QoS may be accomplished through scheduling algorithms and methods described in DOCSIS 1.0 and DOCSIS1.1 specifications.

Although the measurements of these distortions are similar to the PSTN (e.g. signal, signal-to-noise ratio, etc.), the techniques for measuring these losses vary because the characteristics of digital voice transmissions are different from those of digital data transmissions. For example, the butt set device 100 may employ measurement techniques that address network router stability, latency, distribution of end-to-end delays and lost packet rates. There are various methods well known to those skilled in the art for performing such measurements. For example, the butt set device 100 may transmit a single stream of test data packets via the transceiver 301. The test data packets may include certain additional test information. The butt set device 100 may transmit the test data packets over the VoIP network to a server on the network and wait for a reply from the server. This process is referred to as "pinging" to those skilled in the art. The measurements associated with this "round trip" from the butt set device 100 to the network server allow for test measurements to be taken and processed by the processor 303 of the butt set device 100. The user may then be provided the test results via the user interface 307 on the butt set device 100.

The butt set device 100 also may measure distortions of digital data signals on the VoIP network using certain techniques that may be accomplished by execution of algorithms stored in memory. A mean opinion score (MOS), well known to those skilled in the art, provides a numerical measure of the quality of human speech of the network. MOS uses subjective tests (i.e., opinionated scores) that are mathematically averaged to obtain a quantitative indicator of the system performance. The MOS scale is a 1-5 scale as follows: (1) bad, (2) poor, (3) fair, (4) good, and (5) excellent. Perceptual Speech Quality Measurement (PSQM) measures the signal when transmitted through various codecs, which are known in the art. PSQM is based on the ITU P.861 standard and was designed to measure the distortion of voice across voice compression codecs, as perceived by humans. Also, the butt set device 100 similarly may use PSQM+, developed to account for the severe distortions, such as that due to packet loss, that occur in voice-over-packet networks. PSQM+ is performed with real human speech by comparing the reference and received signals.

The butt set device 100 also may measure quality using other techniques, like Perceptual Analysis Measurement System (PAMS). PAMS uses a perceptual model based on human hearing factors, and provides a repeatable, objective means for measuring perceived speech quality. PAMS uses a different signal processing model than the PSQM standard, and produces different types of scores, like a "Listening Quality Score" and a "Listening Effort Score", both which correlate to MOS scores on a 1-5 scale. The Perceptual Evaluation of Speech Quality (PESQ) combines both PSQM+ and PAMS to provide a robust and reliable technique for measuring clarity. Also, butt set device 100 may measure signal quality using the ETSI or TIPHON standards, which assess call quality based on common measurements such as delay, jitter, loss, etc.

Another model for measuring the quality of VoIP communications that may be employed by butt set device 100 is the "E-Model," as defined in ITU Recommendations G.107, G.108, and G.109. The E-Model assess the relative impact that transmission planning decisions have on speech performance, and is comprised of additive terms that capture simultaneous impairments (e.g., environmental noise), delayed impairments (e.g., echo, transmission delay), and codec distortion. Finally, most of the techniques, including PESQ, PSQM+, PAMS, and TIPHON, may be correlated via software to the MOS 1-5 scale.

Other processes that may be used by the butt set device 100 to measure the quality of the VoIP network transmission include, just for example, time-frequency mapping, frequency warping, intensity warping, loudness scaling, asymmetric masking, and cognitive modeling, etc, which are well known to those skilled in the art. Voice quality on an IP network can be determined using these techniques along with conventional measurements for data transmissions. Also, the butt set device 100 may test the VoIP network for incorrect IP configuration, incorrect gateway address designations, echo, and call drop out, for example. Each individual test process and numerous sets of test processes may be initiated in response to a user input or automatically (e.g., in response to being connected to a network). Information relating to each test (e.g., the algorithm(s), data to be transmitted/received, test steps, measurements to be taken, packet processing to be performed, error algorithms, etc.) and sets of tests (e.g., the sequence and identity of the tests in each test set) is stored in memory and retrieved, for example, in response to a user input (e.g., at the key pad). The tests may verify the viability of the VoIP network by determining whether the VoIP network is operable to communicate digitized voice data according to predetermined voice communication parameters, which may be stored in memory. Likewise, all of the test data may be transmitted to the butt set device 100 via the IP network.

Butt set device 100 may accommodate advanced testing features, like the viability and performance of VoIP calls under varying network traffic conditions. In this context, the butt set device 100 itself may be able to load the network and generate varying levels of network traffic, and measure performance based on its known network traffic levels. Such data load traffic may be pings or some other "dummy" IP packets. Also, the butt set device 100 may be programmed to configure the load traffic in terms of the frame size, frame rate/data rate, payload data pattern, priority, etc. Also, certain predetermined load profiles may be stored in memory in the butt set device 100. It should be appreciated that the load established by the butt set device 100 may be a steady load, fixed for a period of time, automatically gradually stepped up from no load to the full load, and/or a random mix of light and heavy loads to more accurately simulate random network traffic. The previous examples are not meant to be exclusive.

Also, the destination of the data load may be predetermined in the butt set device 100. For example, the destination IP address to send the load traffic to may be predetermined (i.e., stored in memory). Also, the butt set device 100 may be programmed to run various tests to different destinations so as to facilitate detecting the location of any sources of network or equipment problems. Also, the butt set device 100 may be capable of sending the data load to either the configured default gateway router, the softswitch, the media gateway and/or the IP address of a dialed phone number (e.g., IP address of the other phone if it is a VoIP phone and/or media gateway if the phone number dialed is a normal PSTN phone). Also, it should be appreciated that the above mentioned examples and techniques are not exclusive and are not necessarily required. The butt set device 100 may be programmed with any one or more of these features, in addition to other features well known to those skilled in the art.

Additionally, the results of the tests or sets of tests (along with the test identification, location, time, etc.) may be transmitted (e.g., via the IP network, FTP, email, and perhaps wirelessly) to a remote computer (e.g., server) for storage and further processing.

In another example embodiment, the transceiver is a power line modem (e.g., certified for HomePlug interface (1.0 or A/V) and is coupled to a power line via a power cord that terminates in a conventional three prong (or two prong) power plug. The user then inserts the plug into a wall socket to connect to the VoIP network. In addition, this embodiment may include a power supply that receives power from the power cord and supplies power (e.g., DC power) to the components of the butt set device 100. As is known in the art, the HomePlug interface is a home networking power line IP network standard. Also, other PLC interfaces may be used instead of, or in addition to, the HomePlug interface.

In other embodiments, in addition to or instead of the tip/ring interface or RJ-11 interface, the network may include a RJ-45 interface (for connecting to an Ethernet network). Also, cable and digital subscriber line (DSL) interfaces similarly may be provided.

In still another embodiment, the invention is essentially a PLC telephone and is comprised of a telephone portion, a voice gateway, and a power line modem. The telephone portion may be housed in a what appears as a conventional telephone handset, having a keypad (perhaps with a DTMF encoder), audio input device, audio output device, on/off switch, LCD display (for displaying keys actuated, caller ID, etc.) and may also include a processor and memory for storing Caller ID data, speed dial numbers, etc. The telephone portion includes an interface for communicating with the voice gateway. One suitable voice gateway is ATA 186 manufactured by Cisco Systems, Inc. The voice gateway may include a network interface (such as an Ethernet interface) for communicating with the power line modem. The power line modem may include a two or three prong wall socket plug for connecting to the power line. The voice gateway may be housed in the handset while the power line modem may be disposed in a separate housing at the wall socket and at the other end of a cable connecting the handset to the power line modem. Such a design would keep the more dangerous voltages of the PLC system remote from the handset and user. The components of this embodiment may be provided power (e.g., DC power) via a power supply receiving power from the power line.

Alternately, the voice gateway and the power line modem may be integrated into a single housing that includes a wall socket plug and an RJ-11 connector permitting connection of any conventional PSTN telephone to the PLC/VoIP network.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. For example, although the invention was described in the context of a butt set device, it should be appreciated that the invention may take any physical form including a handheld meter-type device having a touch screen display. Also, the test device may be capable of being placed in line with the communication network. Furthermore, while the invention was described in the context of a butt set device for use on a PLC VoIP network, the butt set device may instead (or additionally) be designed to be used with a cable VoIP network and/or DSL VoIP network. Those skilled in the art, having the benefit of the teachings of this specification, may affect numerous modifications thereto and changes may be made without departing from the scope and spirit of the invention.

What is claimed is:

1. A portable voice over Internet Protocol (VoIP) test device for testing a VoIP network, comprising:
  a user interface comprising an audio input device and an audio output device;
  a transceiver configured to communicate via the VoIP network;
  a memory storing a test algorithm;
  a codec;
  a processor in communication with said user interface, said transceiver, said codec, and said memory;
  wherein said processor is configured to execute said test algorithm to cause said transceiver to communicate test data over the VoIP network to test the VoIP network; and
  wherein said processor is configured to cause said transceiver to transmit data representing an audio input received via said audio input device over the VoIP network and to cause said audio output device to audibly produce audio data received via the VoIP network.

2. The VoIP test device of claim 1, further comprising a digital signal processor in communication with said processor.

3. The VoIP test device of claim 2, wherein said digital signal processor forms said codec.

4. The VoIP test device of claim 1, wherein said codec is configured to use at least one of the following compression protocols: G.711a-law, G711μ-law, G.720, G.723.1, G.726, G.728, G.729, G.729A, and G.729AB2.

5. The VoIP test device of claim 1, wherein said transceiver comprises a power line modem for communication via a power line communication network and communicatively coupled to a multi-prong plug configured to be plugged into an electric socket.

6. The VoIP test device of claim 1, wherein said transceiver comprises an Ethernet transceiver.

7. The VoIP test device of claim 1, wherein said transceiver comprises a cable modem configured to communicate information with a protocol substantially compliant with a Data Over Cable Service Interface Specification (DOCSIS) specification.

8. The VoIP test device of claim 1, wherein said processor is configured to execute said test algorithm to cause said transceiver to communicate the test data over the VoIP network to test at least one of the group of: jitter, packet loss, and latency of the VoIP network.

9. The VoIP test device of claim 1, wherein said transceiver comprises a digital subscriber line (DSL) modem.

10. The VoIP test device of claim 1, wherein said user interface comprises a manual input device and a display.

11. The VoIP test device of claim 1, wherein said processor is configured to execute said test algorithm to cause said transceiver to communicate the test data over the VoIP network to test at least two of the group of: jitter, packet loss, and latency of the VoIP network.

12. The VoIP test device of claim 1, wherein said transceiver comprises a wireless transceiver.

13. The VoIP test device of claim 1, wherein said wireless transceiver is configured to communicate via an IEEE 802.11 protocol.

14. The VoIP test device of claim 1, further comprising a tip/ring interface in communication with said processor.

15. The VoIP test device of claim 1, wherein the device is configured to communicate signals over a Public Switched Telephone Network (PSTN) via said tip/ring interface to allow a user to test the PSTN network and to establish a voice communication over the PSTN.

16. The VoIP test device of claim 1, further comprising a Power over Ethernet module configured to supply power to one or more components of the device.

17. The VoIP test device of claim 1, further comprising a media access controller (MAC) forming part of said transceiver.

18. The VoIP test device of claim 1, wherein said processor is configured to execute said test algorithm to cause said transceiver to communicate the test data over the VoIP network to test each of jitter, packet loss, and latency of the VoIP network.

19. The VoIP test device of claim 1, further comprising a rechargeable battery configured to provide power to said processor.

20. The VoIP test device of claim 1, wherein the device is configured to communicate over the VoIP network via at least one of the group of: a H.323 protocol and a Session Initiation Protocol (SIP).

21. The VoIP test device of claim 1, wherein said processor is configured to transmit data over the VoIP network to load the VoIP network for testing of the VoIP network.

22. The VoIP test device of claim 1, wherein said memory stores one or more threshold values relating to at least one of jitter buffer size and packet sample rate.

23. The VoIP test device of claim 1, wherein said processor is configured to determine an average latency and a maximum latency of the communicated test data.

24. The VoIP test device of claim 1, wherein said memory includes an Internet Protocol (IP) address stored therein.

25. The VoIP test device of claim 1, wherein said memory includes an algorithm executable by said processor for requesting an IP address stored therein.

26. The VoIP test device of claim 1, wherein said memory includes a MAC address stored therein.

27. The VoIP test device of claim 1, wherein said processor is configured to transmit a result of a test of the VoIP network to a remote computer for storage.

28. The VoIP test device of claim 1, wherein said transceiver is configurable to communicate via a virtual local area network forming at least part of the VoIP network.

29. A method of using a portable test device to test a VoIP network, comprising:
transmitting test data over the VoIP network;
receiving response data in response to transmitting the test data;
wherein the response data is received from the VoIP network via a codec and a media access controller forming part of the device;
processing the response data to determine a quality of communications provided by the VoIP network;
presenting an indication of the quality of communications provided by the VoIP network; and
providing an audio output device and an audio input device in the test device to facilitate bi-directional VoIP communications over a VoIP network by the user.

30. The method of claim 29, wherein said processing comprises at least one of time-frequency mapping, frequency warping, intensity warping, loudness scaling, asymmetric masking, and cognitive modeling.

31. The method of claim 29, wherein said transmitting test data comprises transmitting the test data via a virtual local area network forming at least part of the VoIP network.

32. The method of claim 29, wherein said processing comprises determining signal distortion.

33. The method of claim 29, wherein said processing comprises determining each of signal delay, jitter, and packet loss of the VoIP network.

34. The method of claim 29, wherein said processing comprises determining at least two of the group of: packet jitter, packet loss, and latency of the VoIP network.

35. The method of claim 29, wherein said indication comprises a MOS indication.

36. The method of claim 29, wherein said transmitting comprises wirelessly transmitting the test data.

37. The method of claim 36, wherein said wirelessly transmitting comprises wirelessly transmitting the test data via an IEEE 802.11 protocol.

38. The method of claim 29, further comprising providing a tip/ring interface for establishing a bi-directional voice communication link via a PSTN.

39. The method of claim 38, further comprising testing the PSTN via the tip/ring interface.

40. The method of claim 29, further comprising providing power to one or more components of the device via a Power over Ethernet module.

41. The method of claim 29, further comprising providing power to one or more components of the device via a rechargeable battery.

42. The method of claim 29, further comprising communicating over the VoIP network via at least one of the group of: a H.323 protocol and a Session Initiation Protocol.

43. The method of claim 29, further comprising transmitting load data over the VoIP network to load the VoIP network concurrently with said transmitting test data.

44. The method of claim 29, further comprising transmitting a request for an IP address over the VoIP network.

45. The method of claim 29, further comprising storing an address in memory.

46. The method of claim 29, further comprising transmitting data of the quality of communications provided by the VoIP network to a remote computer for storage.

47. The method of claim 29, wherein said presenting an indication comprises indicating at least one of the following:

incorrect Internet Protocol configuration, incorrect gateway address designation, signal echo, and call drop out.

48. A method of using a test device to test a VoIP network, comprising:
- providing power to one or more components of the device via a Power over Ethernet module;
- receiving an input from a user interface;
- executing a test algorithm in response to the input;
- transmitting test data over the VoIP network;
- receiving response data via the VoIP network;
- decoding the received response data via a codec;
- processing said decoded response data to determine a jitter, a packet loss, and a latency of the VoIP network; and
- providing an audio output device and an audio input device in the test device to facilitate bi-directional voice communications over a VoIP network by a user.

49. The method according to claim 48, wherein said transmitting test data comprises wirelessly transmitting the test data.

* * * * *